(12) United States Patent
Hattori et al.

(10) Patent No.: US 7,692,898 B2
(45) Date of Patent: Apr. 6, 2010

(54) MAGNETIC HEAD THAT INCLUDES NEGATIVE EXPANSION MATERIAL

(75) Inventors: Ryohheita Hattori, San Jose, CA (US); Naoki Kodama, Kanagawa (JP); Hiroyuki Suzuki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 644 days.

(21) Appl. No.: 11/647,029

(22) Filed: Dec. 27, 2006

(65) Prior Publication Data
US 2008/0158742 A1  Jul. 3, 2008

(51) Int. Cl.
G11B 5/31 (2006.01)
(52) U.S. Cl. .................................... 360/126
(58) Field of Classification Search ............. None
See application file for complete search history.

(56) References Cited

U.S. PATENT DOCUMENTS

| | | | | |
|---|---|---|---|---|
| 5,322,559 A * | 6/1994 | Sleight | ............ | 106/401 |
| 5,514,360 A * | 5/1996 | Sleight et al. | ............ | 423/594.12 |
| 5,919,720 A * | 7/1999 | Sleight et al. | ............ | 501/126 |
| 6,183,716 B1 * | 2/2001 | Sleight et al. | ............ | 423/594.13 |
| 6,506,699 B1 * | 1/2003 | Shindo et al. | ............ | 501/7 |
| 6,775,103 B2 | 8/2004 | Kang et al. | | |
| 6,909,578 B1 | 6/2005 | Missell et al. | | |
| 7,067,446 B2 * | 6/2006 | Suzuki et al. | ............ | 501/135 |
| 7,088,550 B2 * | 8/2006 | Gider et al. | ............ | 360/125.75 |
| 7,102,853 B2 * | 9/2006 | Macken et al. | ......... | 360/123.25 |
| 2004/0075944 A1 * | 4/2004 | Macken et al. | ............ | 360/126 |
| 2004/0204307 A1 * | 10/2004 | Suzuki et al. | ............ | 501/134 |
| 2005/0003265 A1 | 1/2005 | Chiang | | |
| 2005/0024957 A1 * | 2/2005 | Gider et al. | ............ | 365/200 |
| 2006/0009345 A1 | 1/2006 | Suzuki et al. | | |
| 2009/0004087 A1 * | 1/2009 | Takenaka et al. | ............ | 423/324 |

FOREIGN PATENT DOCUMENTS

JP         200589236         4/2005

OTHER PUBLICATIONS

"Can achieve "zero-inflation"! Material found in a single new negative thermal expansion materials (Figure)", China Science and Technology Information Institute, (Dec. 20, 2005).
"When Riken, temperature rises, discovering the new substance wchi shrinks", Laser Focus World Japan, (2005).
Takenaka, et al., "Giant Negative Thermal Expansion in Ge-Doped AntiPerovskite Manganese Nitrides", Aplied Physics Letters 87, 261902, (2005).

* cited by examiner

Primary Examiner—Mark Blouin

(57) ABSTRACT

Embodiments of the present invention pertain to a magnetic head that includes negative expansion material. According to one embodiment, the magnetic head includes a read element, a substrate, and at least a partial layer of negative expansion material to control, at least in part, a fly height between an air bearing surface associated with the magnetic head and a disk surface. The material is manganese nitride based and non-insulating and the layer of negative expansion material is parallel to the substrate, according to one embodiment.

19 Claims, 20 Drawing Sheets

US 7,692,898 B2

MAGNETIC HEAD THAT INCLUDES NEGATIVE EXPANSION MATERIAL

TECHNICAL FIELD

Embodiments of the present invention relate to magnetic heads. More specifically, embodiments of the present invention relate to a magnetic head that includes negative expansion material.

BACKGROUND

Manufacturing disk drives is a very competitive business. People that buy disk drives are demanding disk drives that are capable of storing data at ever higher densities. A magnetic head is used to read data from a disk and to write data to a disk. A slider is typically used to position the magnetic head over the appropriate location on a disk.

The density that data can be stored on and read from a disk is directly proportional to the height that the slider's air bearing surface flies over the disk (also commonly known as "fly height"). For example, the closer that the slider can fly over a disk the more data that can be stored and read from the disk. However, the probability that a slider will come into contact with a disk increases as the fly height decreases. Contact between the slider and the disk can result in permanent damage to the disk.

SUMMARY OF THE INVENTION

Embodiments of the present invention pertain to a magnetic head that includes negative expansion material. According to one embodiment, the magnetic head includes a read element, a substrate, and at least a partial layer of negative expansion material to control, at least in part, a fly height between an air bearing surface associated with the magnetic head and a disk surface. The material is manganese nitride based and non-insulating and the layer of negative expansion material is parallel to the substrate, according to one embodiment.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

The slider, among other things, is typically made of materials that have different physical properties. Heat generated by a thermal fly height control (TFC) heater, generated by other components associated with the disk drive, such as the write element, or from sources external to the disk drive can cause the slider's materials to expand resulting in protrusions on the slider's air bearing surface. The protrusions can make it difficult to control the fly height and increase the probability that the slider will come into contact with the disk's surface.

Some materials have characteristics that cause them to expand when heated. However, other materials known as "negative expansion materials" contract when heated. According to one embodiment, negative expansion material is used to control or compensate for the protrusion(s). According to one embodiment, at least a partial layer of negative expansion material is associated with a magnetic head in order to control, at least in part, the fly height of the air bearing surface between the magnetic head and a disk's surface. According to one embodiment, the material that the partial layer is made of is non-insulating and is parallel to the magnetic head's substrate, as will become more evident.

According to one embodiment, a full layer or a partial layer of negative expansion material can be associated with a magnetic head. The partial layer can be a mesh type partial layer or a non-mesh type partial layer. There can be a single layer (full or partial) or multiple layers (full or partial).

A Disk Drive

Figure 1:
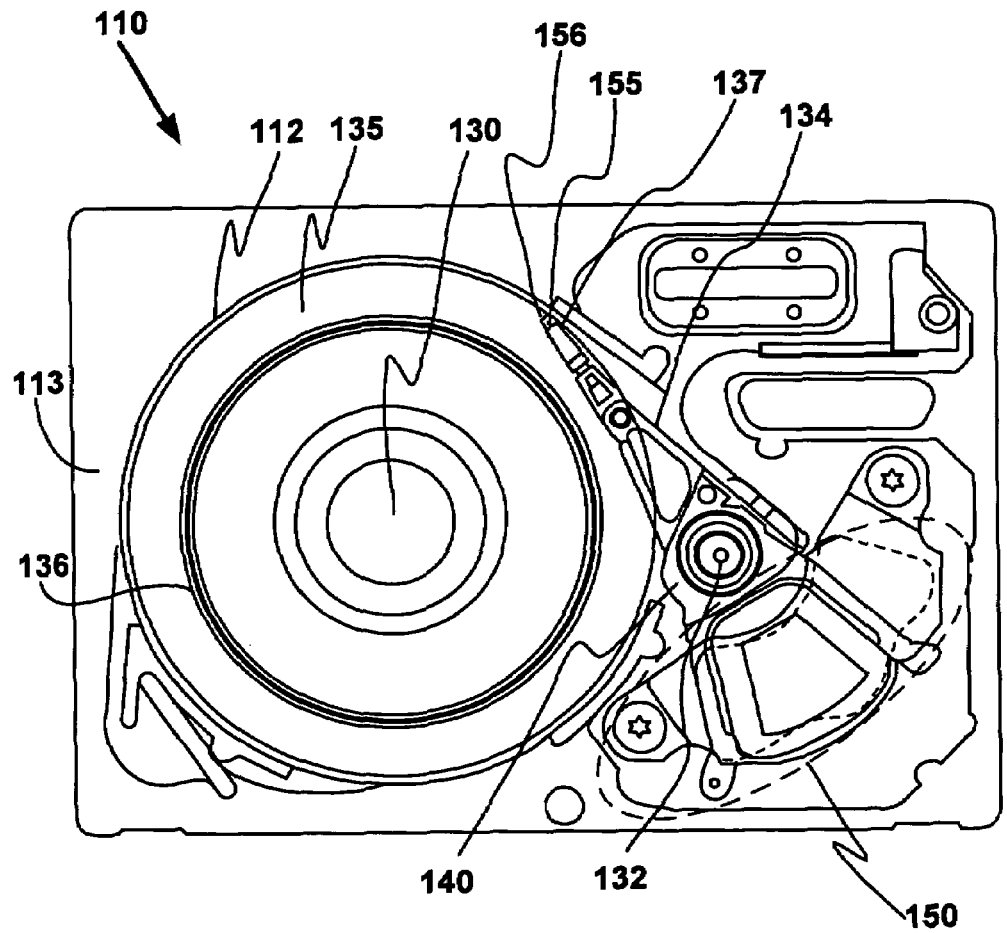
FIG. 1 depicts a plan view of a disk drive for facilitating the discussion of various embodiments of the present invention.

FIG. 1 depicts a plan view of a disk drive for facilitating the discussion of various embodiments of the present invention. The disk drive 110 includes a base casting 113, a motor hub assembly 130, a disk 112, actuator shaft 132, actuator arm 134, suspension assembly 137, a hub 140, voice coil motor 150, a magnetic head 156, and a slider 155.

The components are assembled into a base casting 113, which provides attachment and registration points for components and sub assemblies. A plurality of suspension assemblies 137 (one shown) can be attached to the actuator arms 134 (one shown) in the form of a comb. A plurality of transducer heads or sliders 155 (one shown) can be attached respectively to the suspension assemblies 137. Sliders 155 are located proximate to the disk 112's surface 135 for reading and writing data with magnetic heads 156 (one shown). The rotary voice coil motor 150 rotates actuator arms 135 about the actuator shaft 132 in order to move the suspension assemblies 150 to the desired radial position on a disk 112. The actuator shaft 132, hub 140, actuator arms 134, and voice coil motor 150 may be referred to collectively as a rotary actuator assembly.

Data is recorded onto the disk's surface 135 in a pattern of concentric rings known as data tracks 136. The disk's surface 135 is spun at high speed by means of a motor-hub assembly 130. Data tracks 136 are recorded onto spinning disk surfaces 135 by means of magnetic heads 156, which typically reside at the end of sliders 155.

FIG. 1 being a plan view shows only one head, slider and disk surface combination. One skilled in the art understands that what is described for one head-disk combination applies to multiple head-disk combinations, such as disk stacks (not shown). However, for purposes of brevity and clarity, FIG. 1 only shows one head and one disk surface.

Negative Expansion Material

Figure 2:
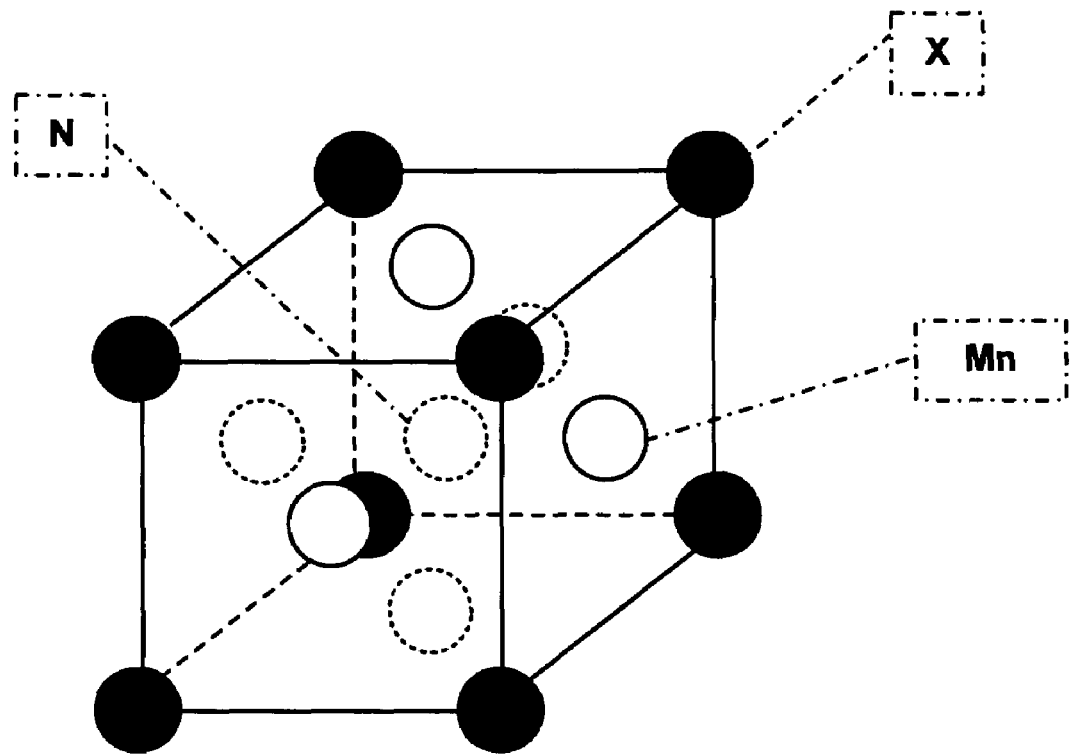
FIG. 2 depicts the atomic structure of material that is used for a negative expansion layer, according to one embodiment.

According to one embodiment, the volume of a negative expansion material decreases when the temperature rises at any temperature or at one or more ranges of temperature. FIG. 2 depicts the atomic structure of material that is used for a negative expansion layer, according to one embodiment. According to one embodiment, the material is a compound that includes nitrogen (N), manganese (Mn), and another compound X. The material depicted in FIG. 1 has a lattice structure where Mn is plain centered and N is cube centered.

The compound X can include Gallium (Ga) and Germanium (Ge). The compound X, according to one embodiment, includes 20-70% Ga with the rest of the compound X being Ge. For example, if compound X was 30% Ga then it could also include 70% Ge. In another example, if compound X was 60% Ga, then it could also include 40% Ge. One example of a compound that the material can be made of is $Mn_3GeN/Mn_3XN$, where X is the compound that includes Ga and Ge.

The material depicted in FIG. 2 has negative expansion properties, according to one embodiment. Further the material depicted in FIG. 2 is non-insulating, according to one embodiment. Many of the examples of the negative expansion material discussed herein shall refer to $Mn_3GeN/Mn_3XN$ however embodiments of the present invention are not limited to $Mn_3GeN/Mn_3XN$.

According to one embodiment, a portion of the nitrogen in a negative expansion material such as $Mn_3GeN/Mn_3XN$ can be substituted with carbon (C). According to one embodiment, 0% to approximately 12% of the nitrogen can be substituted with carbon. $Mn3X(N_{0.88}C_{0.12})$ is an example of a negative expansion material where 12% of the nitrogen is substituted with carbon. $Mn3X(N_{0.94}C_{0.06})$ is an example of a negative expansion material where 6% of the nitrogen is substituted with carbon.

According to another embodiment, the negative expansion material can also include zinc (Zn) and/or copper (Cu). Zinc and/or copper can be used instead of Gallium.

Magnetic Head

Figure 3:
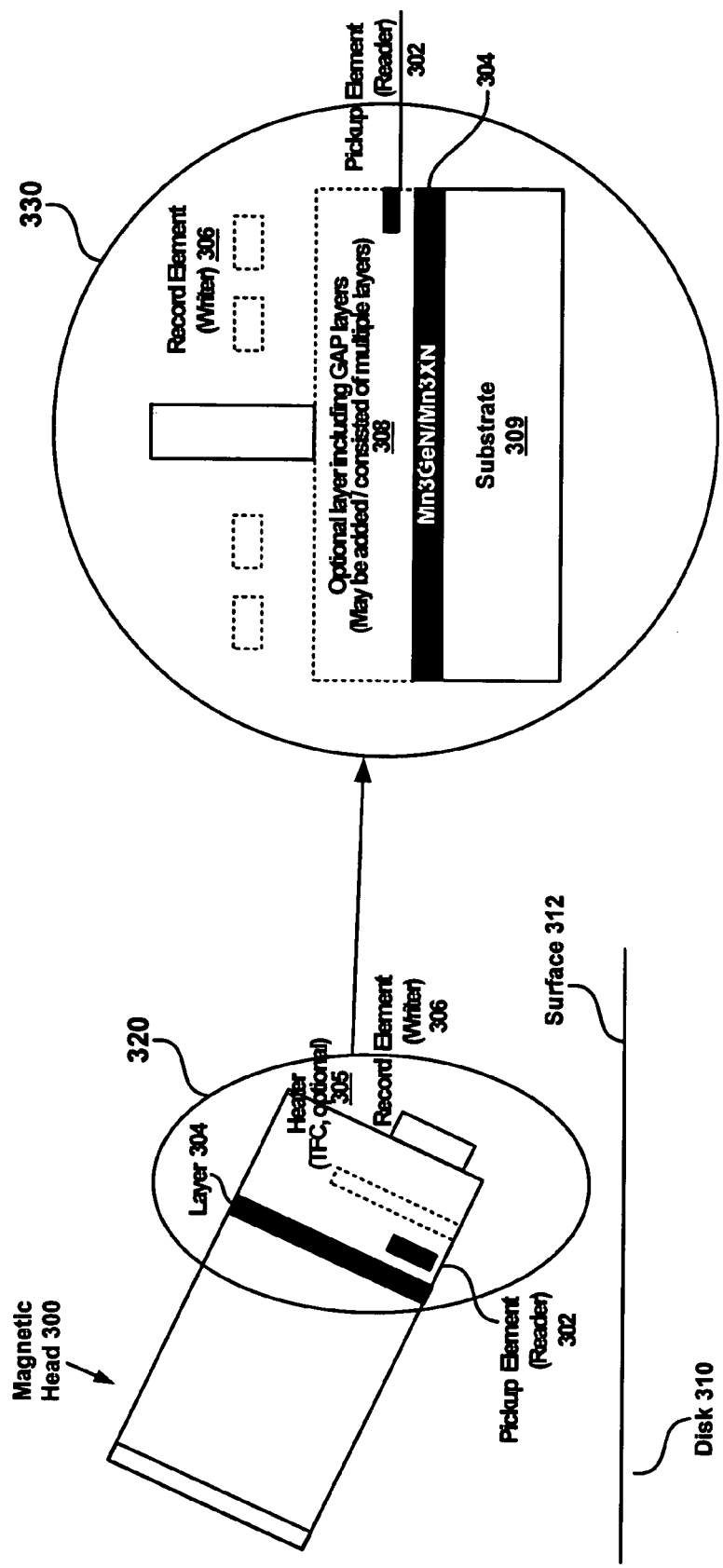
FIGS. 3-6 depict block diagrams of magnetic heads with a full layer of negative expansion material, according to various embodiments.

FIG. 3 depicts a block diagram of a magnetic head, according to one embodiment. The magnetic head 300 depicted in FIG. 3 includes a layer 304 of negative expansion material, a read element 302, a write element 306, and a TFC (thermal fly height control) heater 305. The magnetic head 300 is depicted as if it were flying over a disk 310's surface 312.

FIG. 3 also depicts a cross section 330 of a portion 320 of the magnetic head 300. The portion 320 is sliced horizontally and rotated counter clock wise resulting in the cross section 330. The cross section 330 depicts a substrate 309, the layer 304 of negative expansion material, a read element 302, optional layers 308 that can include one or more gap layers, and a write element 306.

The heater 305 can be used as a part of controlling the fly height of the magnetic head 300 over the disk 310's surface 312. For example, heat generated by the heater 305 can cause the magnetic head 300's air bearing surface to protrude. The protrusion can be used to control the fly height. Further, the heater 305 can generate different degrees of heat. The size of the protrusion varies depending on the amount of heat generated. As the temperature rises, the protrusion will expand, thus lowering the fly height. As the temperature lowers, the protrusion will retract, thus raising the fly height.

The heater 305 is one source of heat that can cause a protrusion of the air bearing surface to expand. Although the protrusion can be used on purpose to control fly height, using for example, a heater 305, conventionally the amount that the protrusion expands is difficult to control. Further, heat from external sources or from other components associated with a magnetic head 300, such as the write element, can also cause or exacerbate protrusions.

Therefore, according to one embodiment, a layer 304 of negative expansion material can be associated with a magnetic head 300 to control at least in part the fly height. Some materials expand when heated. Other materials retract when heated. Negative expansion material is a type of material that retracts when heated and therefore can be used as a part of controlling the size of or compensating for protrusions of the air bearing surface. For example, the negative expansion material can be used to compensate for unwanted or exacerbated protrusions caused by heat from external sources or generated from various components associated with the magnetic head. In the case of a magnetic head 300 that has a TFC heater 305, negative expansion material can be used as a part of controlling the size of the protrusion that is purposely caused by the TFC heater 305. For example, the negative expansion material may be used to cause the protrusion to expand according to a linear function, an exponential function, or a function that plateaus, among other things.

Full Layer

FIGS. 3-6 depict block diagrams of magnetic heads with a full layer of negative expansion material, according to various embodiments. FIG. 3 depicts a full layer 304 of negative expansion material, according to one embodiment. As depicted in FIG. 3, the full layer 304 of negative expansion material is positioned above the substrate 309 and the read element 302 is positioned above the full layer 304 of negative expansion material.

Figure 4:
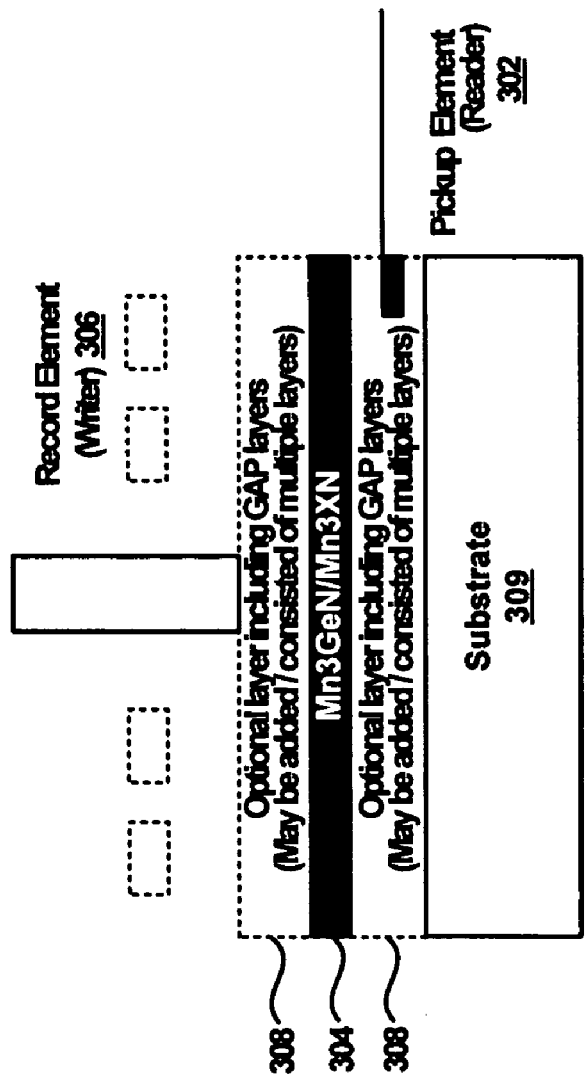

FIG. 4 depicts a full layer 304 of negative expansion material that is between the read element 302 and the write element 306, according to one embodiment. Further, FIG. 4 depicts two optional layers 308 that can include one or more GAP layers. One of the optional layers is above the substrate 309. The full layer 304 of negative expansion material is between two optional layers 308. The read element 302 is between the substrate 309 and the full layer 304 of negative expansion material.

Figure 5:
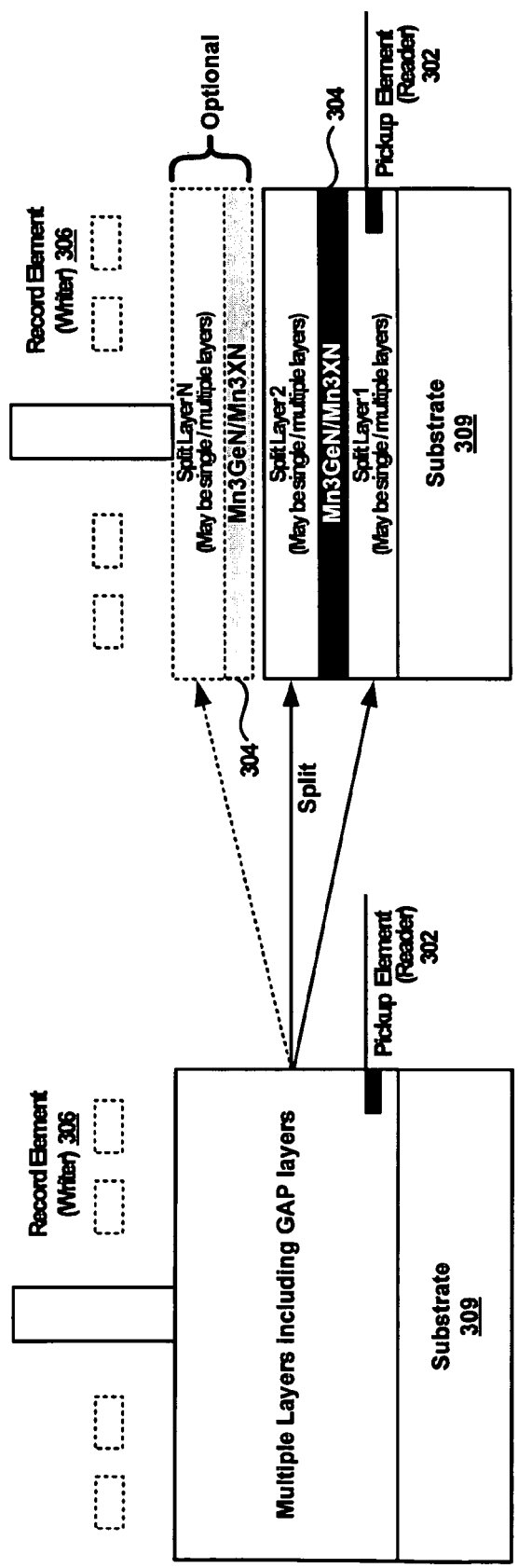

FIG. 5 depicts multiple full layers 304 of negative expansion material, according to one embodiment. According to one embodiment, gap layers, among other things, can be used to separate the full layers 304 of negative expansion material.

Figure 6:
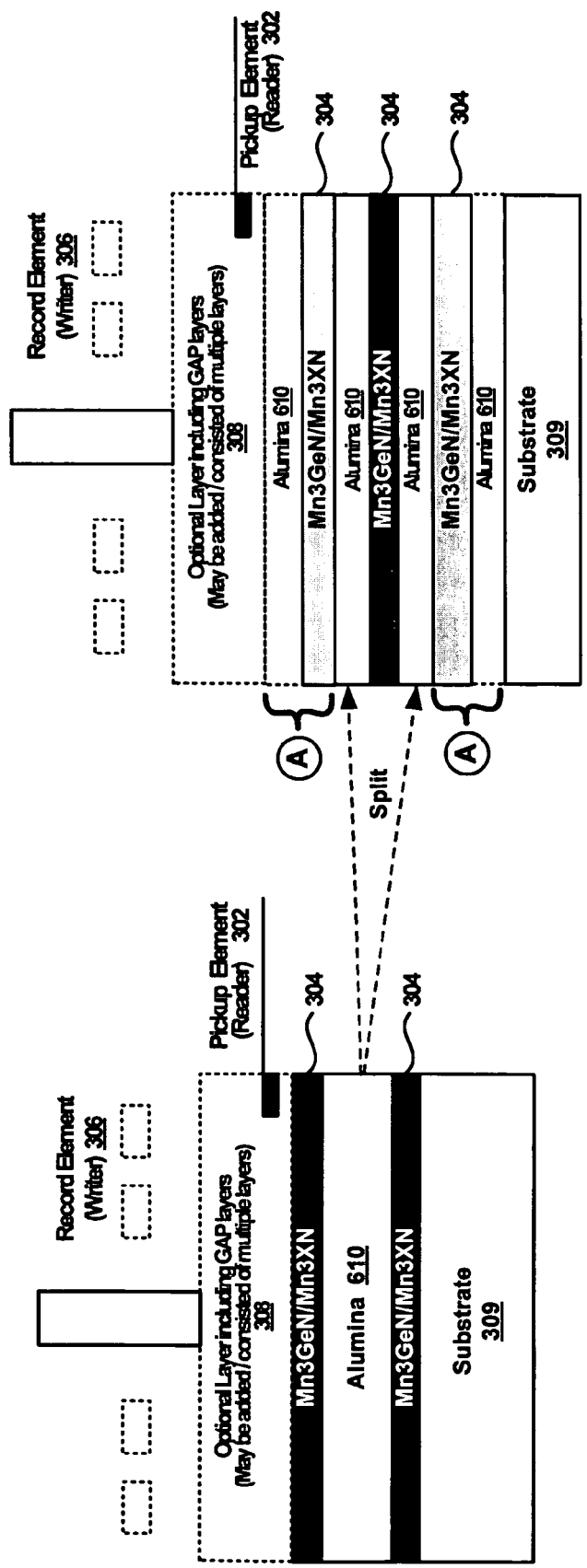

FIG. 6 depicts a magnetic head, according to one embodiment, that includes one or more layers of alumina 610. According to one embodiment, layers of negative expansion material 304 and alumina 610 can alternate. There can be a negative expansion layer 304 between two layers of alumina 610. A negative expansion layer 304 can be between a layer of alumina 610 and the read element 302. There can be one layer of alumina 610 between the substrate 309 and the read element 302, as depicted on the left. Further, as depicted on the right, multiple layers of alumina 610 can separate multiple layers of negative expansion material 304. According to one embodiment, the negative expansion layers 304 on the right of FIG. 6 are thinner than the negative expansion layers 304 on the left of FIG. 6.

Partial Layer

FIGS. 7-15 depict block diagrams of magnetic heads with partial layers of negative expansion material, according to various embodiments. A partial layer of negative expansion material can be a mesh type partial layer 704, as depicted in FIGS. 7-11, or a non-mesh type partial layer 1204, as depicted in FIGS. 12-15.

Figure 7:
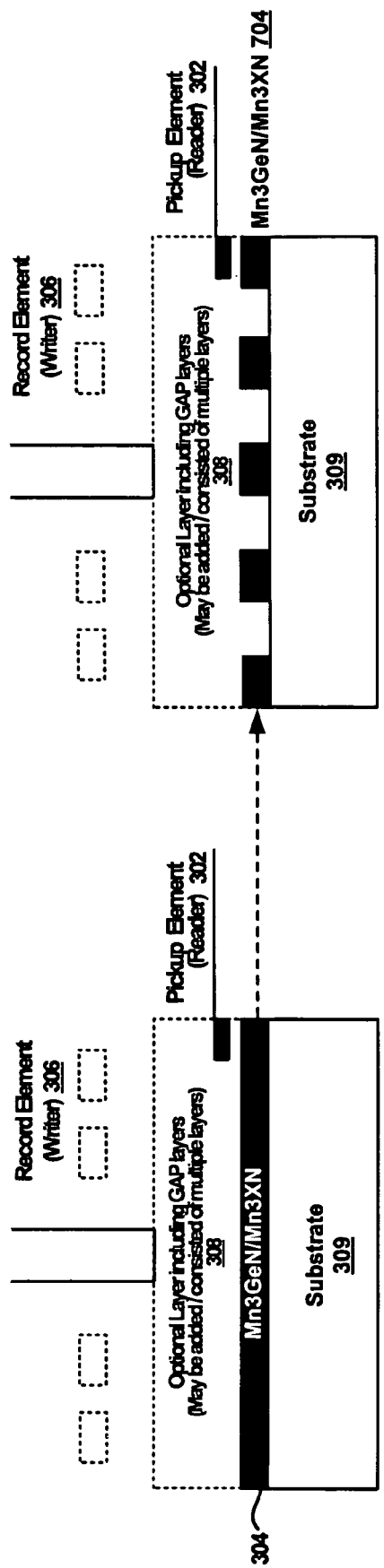
FIGS. 7-15 depict block diagrams of magnetic heads with partial layers of negative expansion material, according to various embodiments.
Figure 8:
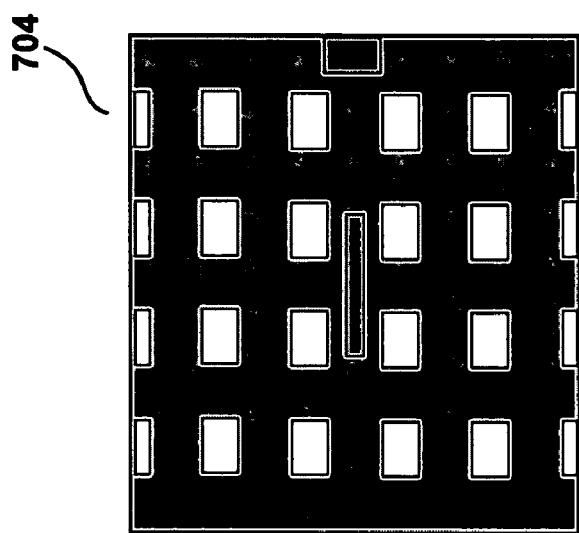
Figure 9:
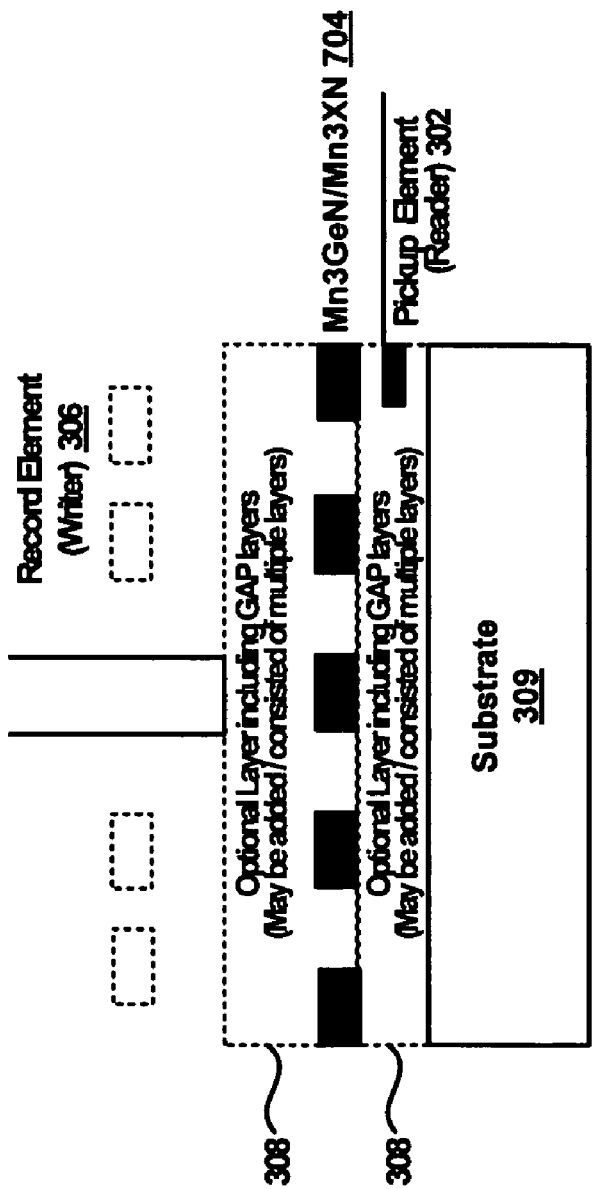

FIG. 7 depicts a mesh type partial layer 704 that is in a relative position similar to the full layer 304 depicted on the right side of FIG. 3, according to one embodiment. FIG. 8 depicts a horizontal cross section of a mesh type partial layer 704, according to one embodiment. FIG. 9 depicts a mesh type partial layer 704 that is in a relative position similar to the full layer 304 depicted in FIG. 4, according to one embodiment.

Figure 10:
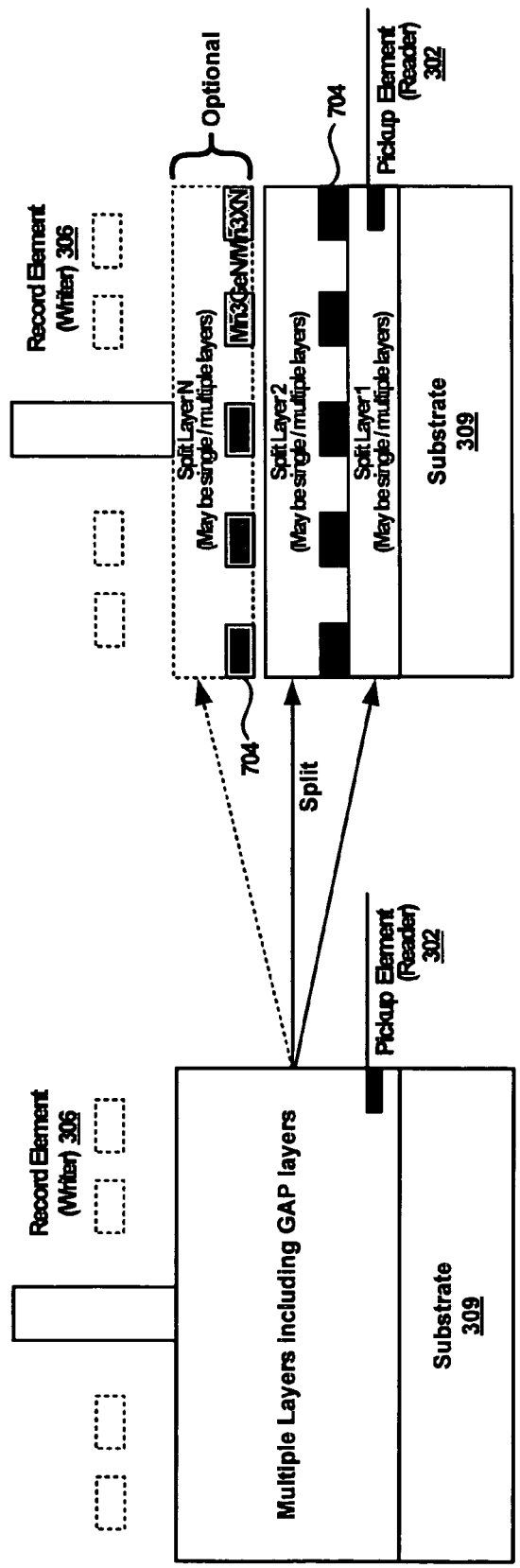
Figure 11:
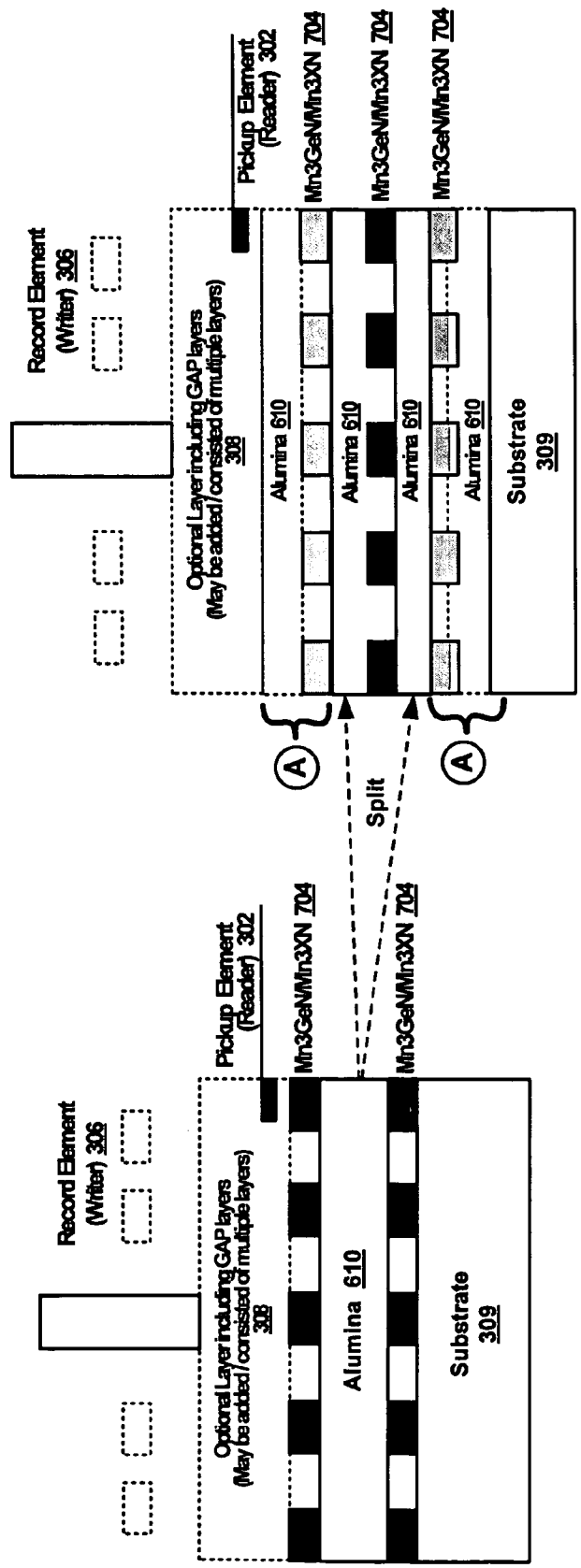

FIG. 10 depicts multiple mesh type partial layers 704, according to one embodiment. The multiple mesh type partial layers 704 depicted in FIG. 10 are in relative positions similar to the multiple full layers 304 depicted in FIG. 5. FIG. 11 depicts a magnetic head, according to one embodiment, that includes one or more layers of alumina 610 that separate mesh type partial layers 704. The mesh type partial layers 704 and the one or more layers of alumina 610 depicted in FIG. 11 are relative positions similar to the layers of alumina 610 and the one or more full layers 304 depicted in FIG. 6.

Figure 12:
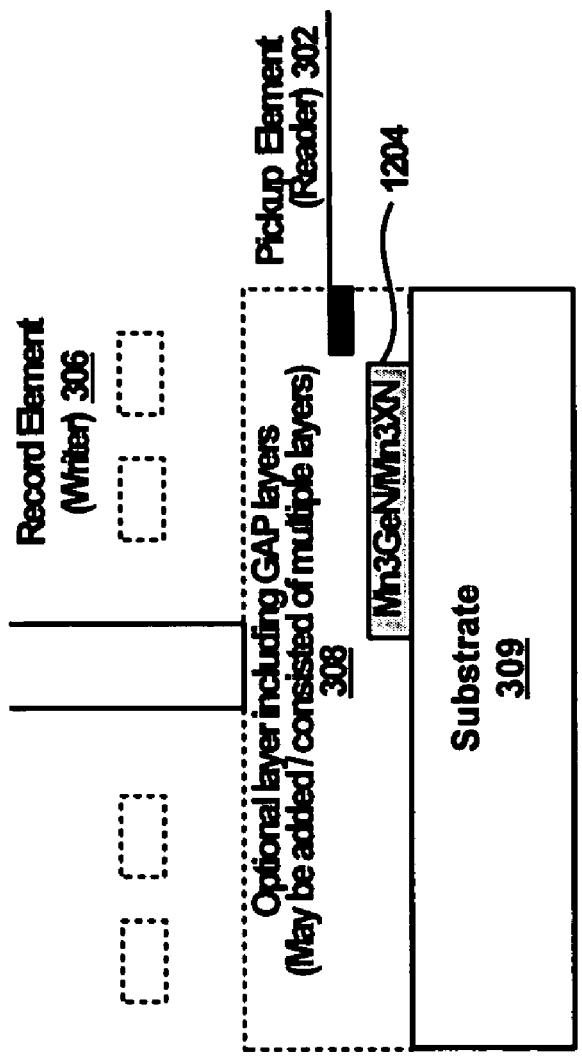
Figure 13:
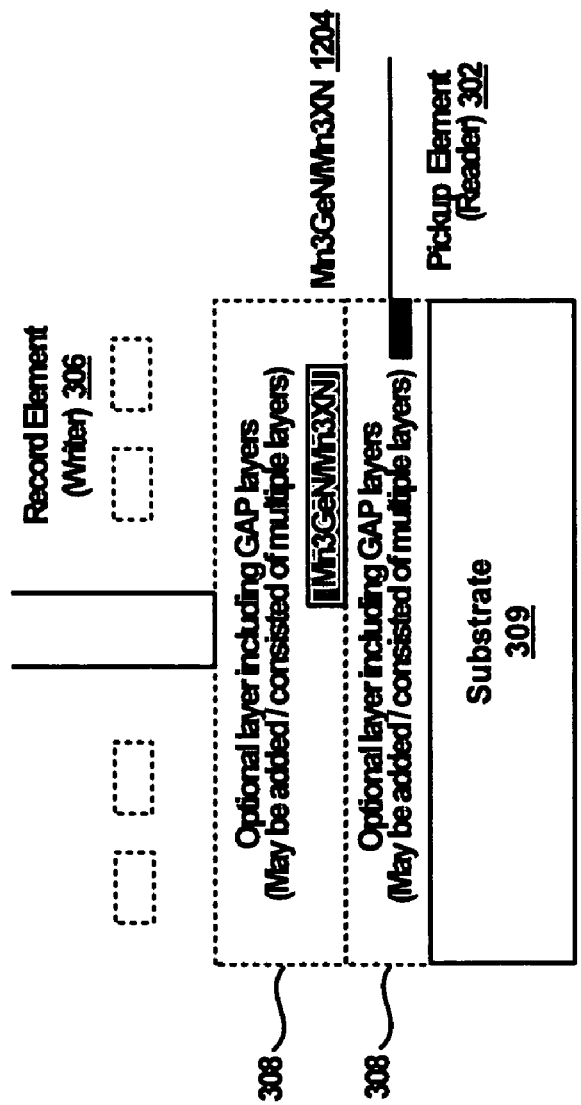

FIG. 12 depicts a non-mesh type partial layer 1204 that is in a relative position similar to the full layer 304 depicted on the right side of FIG. 3, according to one embodiment. FIG. 13 depicts a non-mesh type partial layer 1204 that is in a relative position similar to the full layer 304 depicted in FIG. 4, according to one embodiment.

Figure 14:
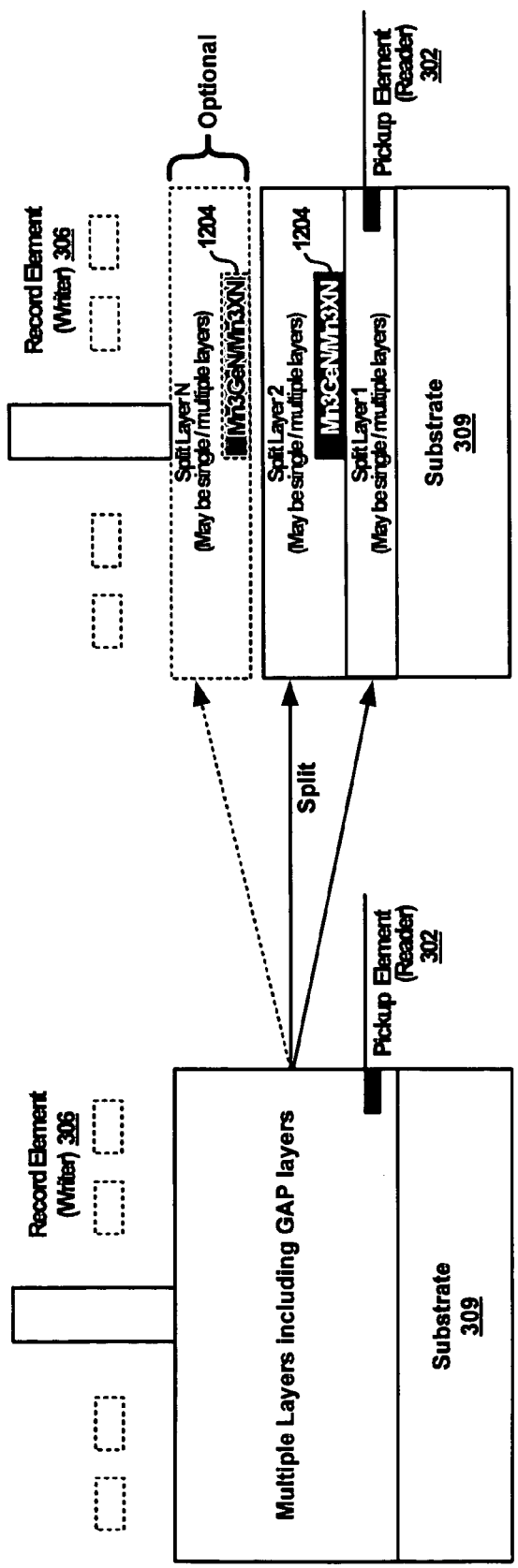
Figure 15:
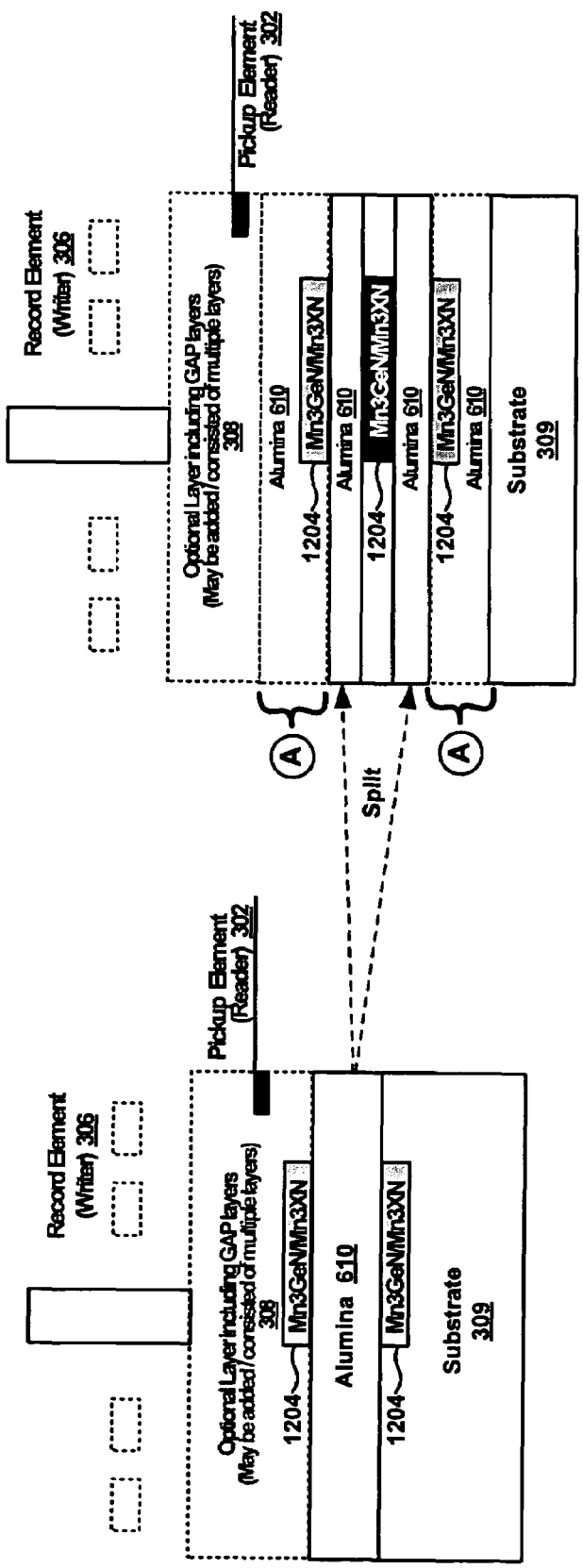

FIG. 14 depicts multiple non-mesh type partial layers 1204, according to one embodiment. The multiple non-mesh type partial layers 1204 depicted in FIG. 14 are in relative positions similar to the multiple full layers 304 depicted in FIG. 5. FIG. 15 depicts a magnetic head, according to one embodiment, that includes one or more layers of alumina 610 that separate non-mesh type partial layers 1204. The non-mesh type partial layers 1204 and the one or more layers of alumina 610 depicted in FIG. 15 are in relative positions similar to the layers of alumina 610 and the one or more full layers 304 depicted in FIG. 6.

Thermal Fly Height Control Heater

FIGS. 16-19 depicts magnetic heads that include one or more TFC heaters 610, according to various embodiments. A TFC heater 610 can be at any location relative to the substrate 309, the read element 302 and the write element 306. According to one embodiment, at least one of the TFC heaters 1610 is positioned near the substrate 309, for example, to avoid corrosion.

Figure 16:
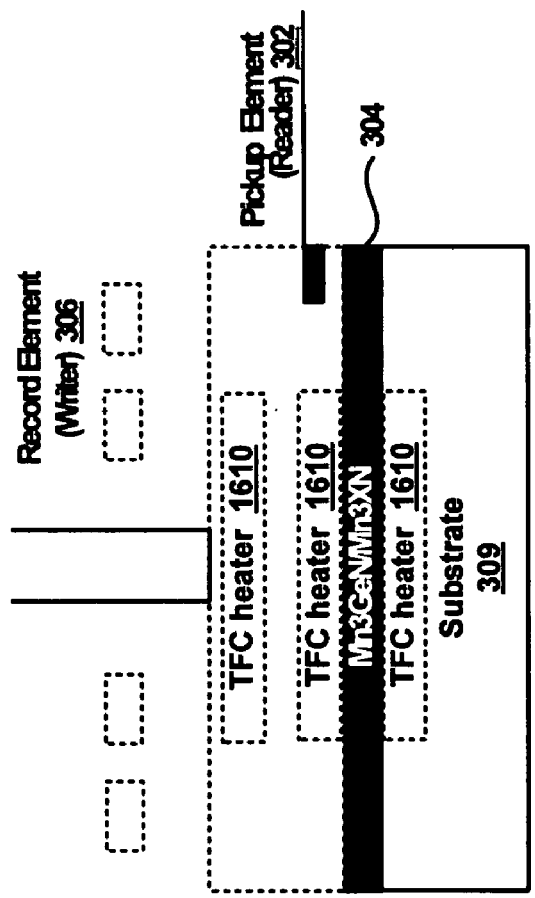
FIGS. 16-19 depicts magnetic head that include one or more TFC heaters, according to various embodiments.
Figure 17:
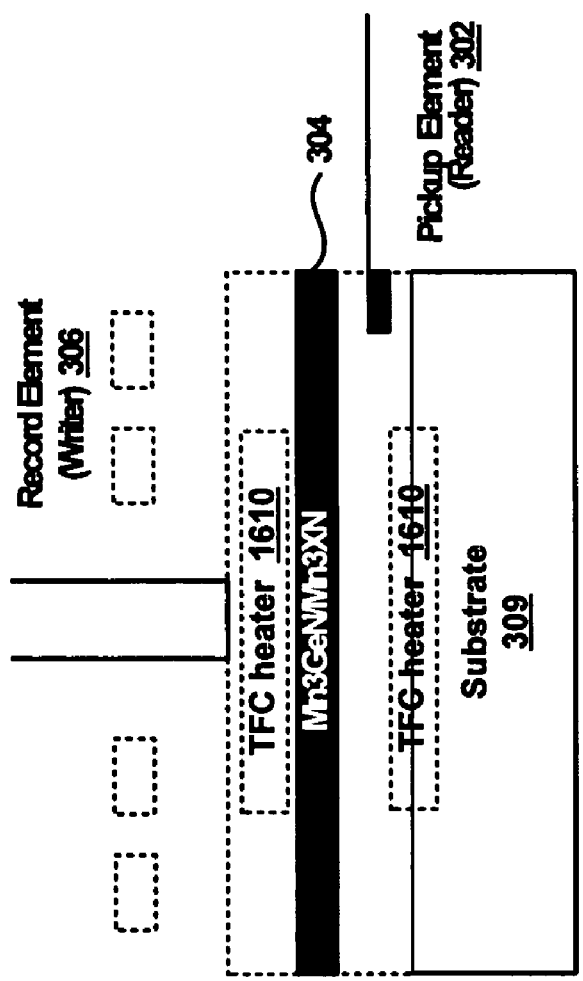
Figure 18:
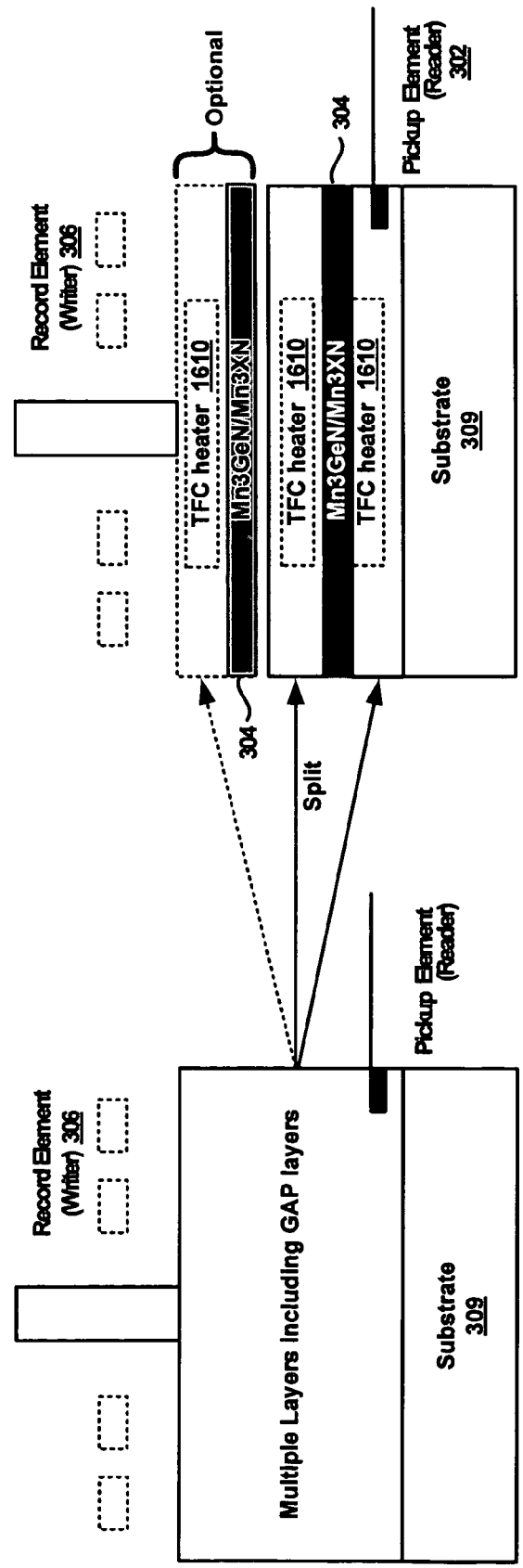
Figure 19:
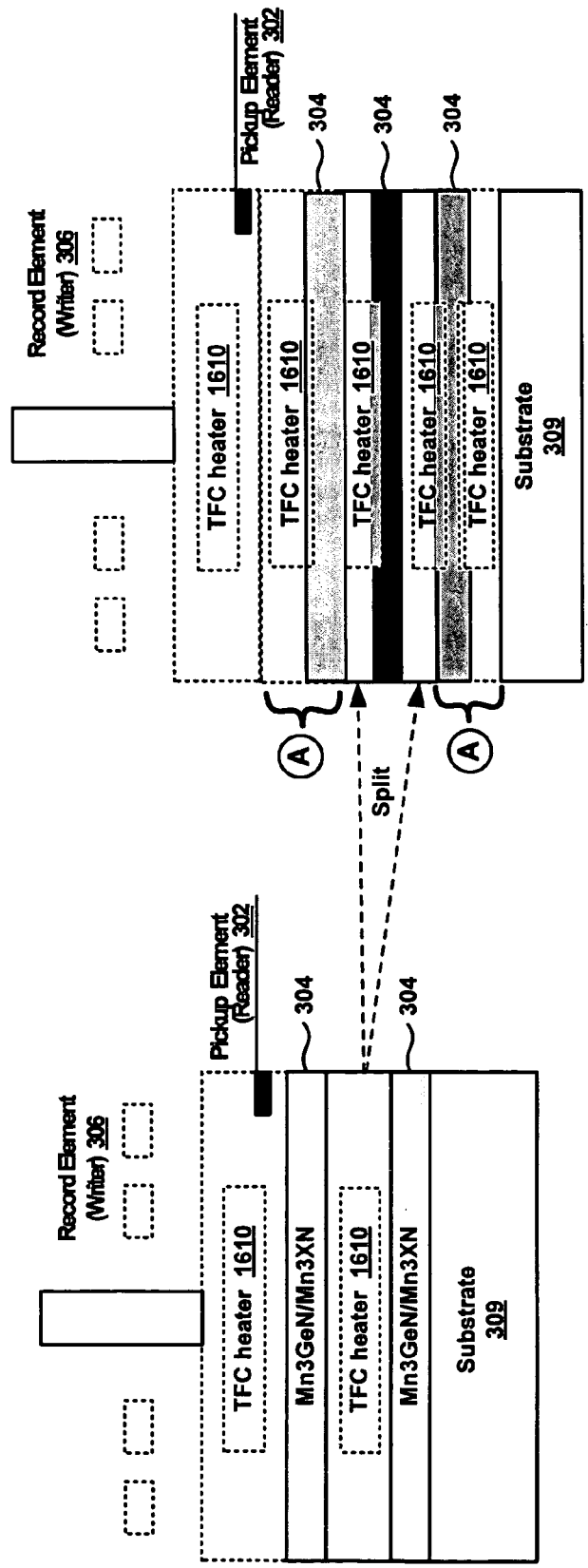

FIG. 16 depicts a magnetic head, according to one embodiment, with three TFC heaters 1610. One of the heaters 1610 partially overlaps the substrate 309 and partially overlaps a full layer 304 of negative expansion material. FIG. 17 depicts a magnetic head, according to one embodiment, with two TFC heaters 1610. One heater 1610 is below a full layer 304 of negative expansion material and the other heater 1610 is above the full layer 304 of negative expansion material. The heater 1610 closest to the substrate 309 partially overlaps the substrate 309 and partially overlaps a gap layer. FIGS. 18 and 19 depict magnetic heads with alternating heaters 1610 and negative expansion layers 304, according to various embodiments. A "block" as depicted in FIG. 19 can include, negative expansion material and a heater, among other things. FIG. 19 illustrates that the blocks A may or may not be a part of a magnetic head.

Method of Manufacturing a Magnetic Head

Figure 20:
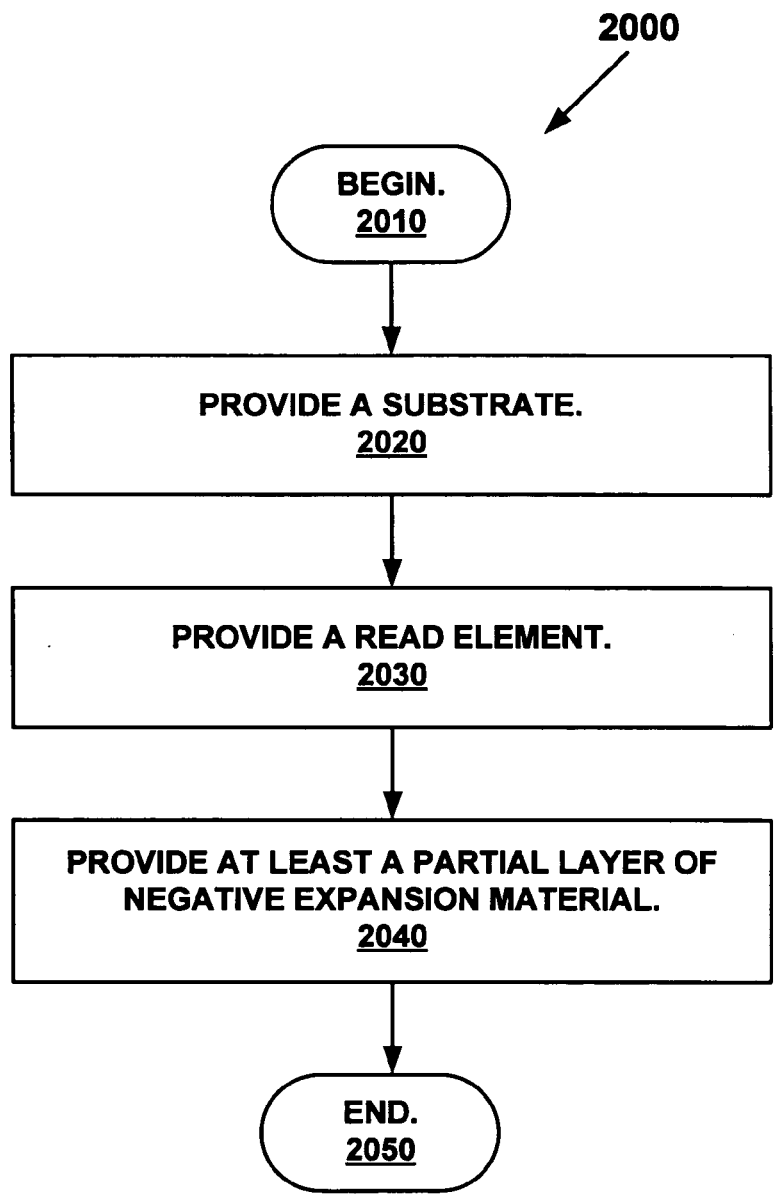
FIG. 20 depicts a flowchart describing a method for manufacturing a magnetic head using negative expansion material, according to one embodiment of the present invention.

FIG. 20 depicts a flowchart 2000 describing a method for manufacturing a magnetic head using negative expansion material, according to one embodiment of the present invention. Although specific steps are disclosed in flowchart 2000, such steps are exemplary. That is, embodiments of the present invention are well suited to performing various other steps or variations of the steps recited in flowchart 2000. It is appreciated that the steps in flowchart 2000 may be performed in an order different than presented, and that not all of the steps in flowchart 2000 may be performed.

According to one embodiment, a thin film process is used for manufacturing a magnetic head that includes at least a partial layer of negative expansion material. Various methods, such as sputter etch, DC pulse sputtering, DC magnetron sputtering, facing target type sputtering, and radio frequency (RF) magnetron sputtering, can be used to manufacture a magnetic head, according to various embodiments of the present invention.

At step 2010, the method begins.

At step 2020, a substrate is provided. For example, referring to FIGS. 3-19, a substrate that is the base layer for manufacturing a magnetic head is created. At step 2030, a read element is provided. For example, referring to FIGS. 3-19, a read element is created for the partially manufactured magnetic head. The read element according to one embodiment is above the substrate.

At step 2040, at least a partial layer of negative expansion material is provided. For example, negative expansion material as depicted in FIG. 2 can be used as a part of manufacturing a magnetic head. Referring to FIGS. 3-19 the negative expansion material is above the substrate. According to one embodiment, the negative expansion material is between the read element and the substrate as depicted in FIG. 3. According to another embodiment, the negative expansion material is between the read element and the write element as depicted in FIG. 4.

According to one embodiment, as described herein, the negative expansion material is used to control, at least in part, a fly height between a magnetic head's air bearing surface and a disk's surface. The material is non-insulating and is parallel to the substrate, according to one embodiment.

The negative expansion material, according to one embodiment, is a full layer as depicted in FIGS. 3-6. According to another embodiment, a partial layer of negative expansion material is provided as depicted in FIGS. 7-11. A partial layer may be a mesh type partial layer 704 as depicted in FIGS. 7-11 or a non-mesh type partial layer 1204 as depicted in FIGS. 12-15.

There may be a single layer of negative expansion material or multiple layers of negative expansion material as depicted in FIG. 2. The layers of negative expansion material may be separated by layers of alumina as depicted in FIG. 6. The layers of negative expansion material, according to another embodiment, may be separated by optional layers, which may include one or more optional layers, as depicted in FIGS. 4 and 5. According to one embodiment, the one or more layers of negative expansion material, whether partial or full, are approximately 100 nanometers to 1 micron in width.

According to one embodiment, the sputter environment used for providing one or more layers (whether partial or full) of negative expansion material uses a Manganese (Mn) atomic concentration that is greater than 3 times the sum of Ge and X, where X is a compound that includes 20-70% Ga with the rest of the compound X being Ge. According to another embodiment, the sputter environment uses Argon (Ar) gas in combination with Nitrogen ($N_2$) gas.

At step 2050, the method ends.

One or more heaters may also be a part of a magnetic head as depicted in FIGS. 16-19 that is manufactured using the method described by flowchart 2000.

CONCLUSION

According to one embodiment, a magnetic head with at least a partial layer of manganese nitride based negative expansion material manufactured using a thin film process is provided. None of the prior art teaches using a thin film process to provide a magnetic head with at least a partial layer of manganese nitride based negative expansion material.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A magnetic head that includes negative expansion material, the magnetic head comprising,
   a read element,
   a substrate; and
   at least a partial layer of negative expansion material to control, at least in part, a fly height between an air bearing surface associated with the magnetic head and a disk surface, wherein the material is manganese nitride based and non-insulating and wherein the layer of negative expansion material is parallel to the substrate.

2. The magnetic head of claim 1, farther comprising:
   a layer of alumina between the substrate and the read element.

3. The magnetic head of claim 2, farther comprising:
   multiple partial layers of negative expansion material.

4. The magnetic head of claim 3, wherein the layers of alumina and the partial layers of negative expansion material alternate.

5. The magnetic head of claim 1, farther comprising:
   a write element, wherein the partial layer of negative expansion material is between the read element and the write element.

6. The magnetic head of claim 1, wherein the partial layer of negative expansion material is a mesh type layer.

7. The magnetic head of claim 1, wherein the at least partial layer of negative expansion material is a fall layer of negative expansion material.

8. The magnetic head of claim 1, farther comprising:
   a thermal fly height control (TFC) heater.

9. The magnetic head of claim 1, wherein the material includes Carbon (C).

10. The magnetic head of claim 9, wherein the material further includes a compound X that comprises Gallium (Ga) and Germanium (Ge).

11. The magnetic head of claim 10, wherein the compound X includes 20-70% Ga with the rest of the compound X being Ge.

12. A method of manufacturing a magnetic head, the method comprising:
    providing a substrate;
    providing a read element that is above the substrate; and
    providing at least a partial layer of negative expansion material above the substrate to control, at least in part, a fly height between an air bearing surface associated with the magnetic head and a disk surface, wherein the material is manganese nitride based and non-insulating and wherein the layer of negative expansion material is parallel to the substrate.

13. The method as recited in claim 12, further comprising:
    using a thin film process to manufacture the magnetic head.

14. The method as recited in claim 13, wherein the thin film process is selected from a process consisting of sputter etch, DC pulse sputtering, DC magnetron sputtering, facing target type sputtering, and radio frequency (RF) magnetron sputtering.

15. The method as recited in claim 12, further comprising:
    using a sputter environment that has a Manganese (Mn) atomic concentration that is greater than 3 times the sum of a compound that includes Gallium (Ga) and Germanium (Ge).

16. The method as recited in claim 12, wherein the providing of the at least partial layer of negative expansion material further comprises:
    providing at least a partial layer of negative expansion material that includes Zinc (Zn).

17. A method of using negative expansion material to manufacturer a magnetic head, the method comprising:
    providing a substrate;
    providing a read element that is above the substrate; and
    providing at least a partial layer of negative expansion material that includes Copper (Cu) above the substrate to control, at least in part, a fly height between an air bearing surface associated with the magnetic head and a disk surface, wherein the material is non-insulating and wherein the layer of negative expansion material is parallel to the substrate.

18. The method as recited in claim 17, wherein the providing of the at least partial layer of negative expansion material farther comprises:
    providing at least a partial layer of negative expansion material that further includes a compound X that comprises Gallium (Ga) and Germanium (Ge).

19. The method as recited in claim 18, wherein the providing of the at least partial layer of negative expansion material farther comprises:
    providing at least a partial layer of negative expansion material, wherein the compound X includes 20-70% Ga with the rest of the compound X being Ge.

* * * * *

UNITED STATES PATENT AND TRADEMARK OFFICE
CERTIFICATE OF CORRECTION

PATENT NO. : 7,692,898 B2  
APPLICATION NO. : 11/647029  
DATED : April 6, 2010  
INVENTOR(S) : Hattori et al.

Page 1 of 1

It is certified that error appears in the above-identified patent and that said Letters Patent is hereby corrected as shown below:

Column 7, Line 53, Claim 2: Delete "farther" and insert -- further --

Column 7, Line 56, Claim 3: Delete "farther" and insert -- further --

Column 7, Line 61, Claim 5: Delete "farther" and insert -- further --

Column 8, Line 2, Claim 7: Delete "fall" and insert -- full --

Column 8, Line 4, Claim 8: Delete "farther" and insert -- further --

Column 8, Line 55, Claim 18: Delete "farther" and insert -- further --

Column 8, Line 61, Claim 19: Delete "farther" and insert -- further --

Signed and Sealed this  
Twenty-second Day of February, 2011

David J. Kappos  
*Director of the United States Patent and Trademark Office*